Jan. 25, 1966 K. MEISSNER 3,231,457
VENEER
Filed April 12, 1961
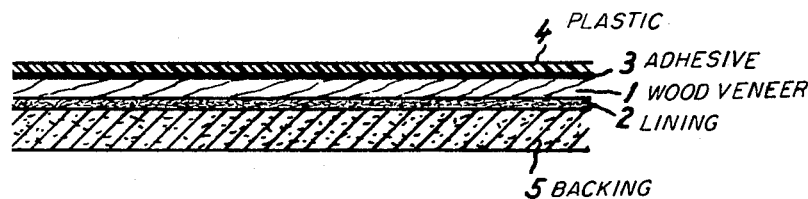
Inventor:
Kurt Meissner
by: George B. Spencer
Attorney

United States Patent Office 3,231,457
Patented Jan. 25, 1966

3,231,457
VENEER
Kurt Meissner, Berlin, Germany, assignor to Mikroholz
G.m.b.H., Berlin-Neukolln, Germany
Filed Apr. 12, 1961, Ser. No. 102,587
Claims priority, application Germany, Apr. 22, 1960,
M 45,070
6 Claims. (Cl. 161—151)

The present invention relates generally to room coverings for floors, walls, ceilings, and the like, and more particularly to a veneer having a polyvinyl chloride foil as the outer surface thereof and which is inseparably bonded to the remainder of the laminate structure or veneer.

In the past, floor coverings have been produced using synthetic plastic materials, by covering sheets or webs formed from waste rubber with a polyvinyl chloride foil and, if desired, with fabric inserts added.

In some instances it is desirable to give these coverings the appearance of a wooden floor and in attempting to acomplish this an unvarnished veneer has been attached to a backing formed from rubber waste, and then a polyvinyl chloride (PVC) layer was applied thereto. However, a reasonably intimate bond between the PVC foil or layer and its backing or base may only be obtained if the PVC foil is melted when applied to the base. Yet, even when this is done the PVC layer, it was found in experiments, could be relatively easily stripped from the unvarnished veneer and this in turn could be easily stripped from the backing formed from the waste rubber. Therefore, the synthetic plastic coverings provided with veneer inserts which have been produced thus far in the art have been unsuitable for the production of floors and the like. Furthermore, these coverings can only be manufactured in short lengths.

With these defects of the prior art in mind, it is an object of the present invention to provide an intermediate laminate structure between the backing of rubber waste or other base material and the PVC foil, which can be inseparably bonded to the PVC foil so as to form a proper floor covering wherein the PVC foil cannot be removed from the veneer, or the veneer removed from its base.

A further object of the invention is to provide a synthetic plastic covering which may be produced in relatively long webs or sheets and which may be stored and transported in rolls so as to expedite further processing of the semi-finished products.

The foregoing objects and others ancillary thereto are accomplished according to a preferred embodiment of the invention, wherein a thinly-cut wood veneer is attached to a fabric which has previously been impregnated with a thermoplastic adhesive and dried. The wood veneer and fabric are applied to each other under heat and pressure. Preferably, a cotton fleece is used as the fabric and is inseparably bonded to the thinly-cut wood veneer and insures a firm adhesion to the backing or base. The base is preferably formed of rubber waste or the like, to which the wood veneer and fabric are attached during subsequent operations by means of pressure. The thinly-cut wood veneer as well as the dried fabric may be supplied in rolls and as they are unwound from the rolls may be pressed together by means of heated rollers to form a continuous length of veneer which is dry when delivered from the apparatus.

Additional objects and advantages of the present invention will become apparent upon consideration of the following description when taken in conjunction with the accompanying drawings, in which an enlarged vertical sectional view of the laminated construction of the veneer is shown.

With more particular reference to the drawing, numeral 2 designates a lining such as cotton fleece which is impregnated with a thermoplastic adhesive and then dried. The thinly-cut wood veneer 1 is then bonded thereto by using heat and pressure which causes the adhesive to bond these layers together. For the sake of expediency in production both the thinly-cut wood veneer and the cotton fleece may be supplied in rolls so that the bonding operation can take place as a continuous process. Then, an additional adhesive layer 3 is applied to the exposed surface of the backed veneer which is then dried. It is this adhesive which will serve to bond this material to a PVC foil.

This semi-finished product with or without the adhesive coating 3 is then supplied to a plastic factory in rolls where the PVC foil is applied under heat and pressure. When using the product composed in accordance with the present invention a temperature of only from substantially 100° to 120° C. is needed for this bonding, and the time during which pressure is applied can be considerably shortened. In experiments carried out earlier, the PVC foil melted at temperatures between 150° and 160° C. However, when the present invention is used the PVC foil is only superficially softened to a sufficient extent that the surface of the PVC foil will respond to a superimposed presser plate. The foil is heated to a sufficient extent that a mat or glossy surface is obtained.

As has been previously mentioned the semi-finished product is supplied to the plastic factory in this form with or without the adhesive 3. At the factory, if it has not been provided previously, adhesive layer 3 is applied and then the PVC foil 4 is applied under heat and pressure, after which the entire laminate is applied to a backing 5 of waste rubber or the like.

The following is an example of the above-described method for forming a laminate particularly suited for flooring, it being understood that this example is illustrative only and not intended to be a limitation of the present invention in any way. A fabric was impregnated with polyvinyl acetate, and was applied to a wood veneer having a thickness of 0.15 mm. for a period of one minute at a temperature of 90° C. and under a pressure of 5 kilogram/square centimeter.

In practice, the veneer is dipped into an adhesive bath so that both sides are saturated with adhesive, whereafter excess adhesive is squeezed out.

Other veneer thickness may be used, as, for example, veneer having a thickness of between 0.04 and 0.25 mm.

It will be understood that the above description of the present invention is susceptible to various modifications, changes and adaptations, and the same are intended to be comprehended within the meaning and range of equivalents of the appended claims.

I claim:

1. As an article of manufacture, a laminate consisting of: a thin wood veneer; a fabric impregnated with a thermoplastic adhesive and bonded to one face of said wood veneer; an adhesive on the other side of said wood veneer; and a polyvinyl chloride foil on said other side of said wood veneer and bonded thereto by said last-mentioned adhesive.

2. A laminate according to claim 1, wherein the fabric is a cotton fleece.

3. A laminate according to claim 1, wherein a coloring agent is mixed with the thermoplastic adhesive applied to the veneer to tint the wood veneer.

4. The article of manufacture defined in claim 1 wherein said adhesives are resinous.

5. The article of manufacture defined in claim 1 wherein said fabric is porous.

6. As an article of manufacture, a laminate consisting of: a thin wood veneer; a fabric impregnated with a thermoplastic adhesive and bonded to one face of said wood veneer; an adhesive on the other side of said wood veneer; a polyvinyl chloride foil on said other side of said wood veneer and bonded thereto by said last-mentioned adhesive; and a backing on the exposed side of said fabric and bonded thereto by said first-mentioned adhesive.

References Cited by the Examiner

UNITED STATES PATENTS

| | | | |
|---|---|---|---|
| 2,030,819 | 2/1936 | Herzog et al. | 161—270 |
| 2,185,356 | 1/1940 | Robertson | 154—46 |
| 2,275,957 | 3/1942 | Groff | 154—95 |
| 2,565,251 | 8/1951 | Malmstrom | 161—55 |
| 2,675,338 | 4/1954 | Phillips | 161—250 |
| 2,729,585 | 1/1956 | Gruber et al. | 161—254 |
| 2,748,046 | 3/1956 | Works et al. | 154—116 |
| 3,011,932 | 12/1961 | Downing | 117—148 |
| 3,078,179 | 2/1963 | Kuhn et al. | 117—47 |

FOREIGN PATENTS 546,686  7/1942  Great Britain.

EARL M. BERGERT, *Primary Examiner.*

CARL F. KRAFFT, HAROLD ANSHER, *Examiners.*